S. P. MATHER.
Submarine Telescope.
No. 43,465.                                   Patented July 5, 1864.
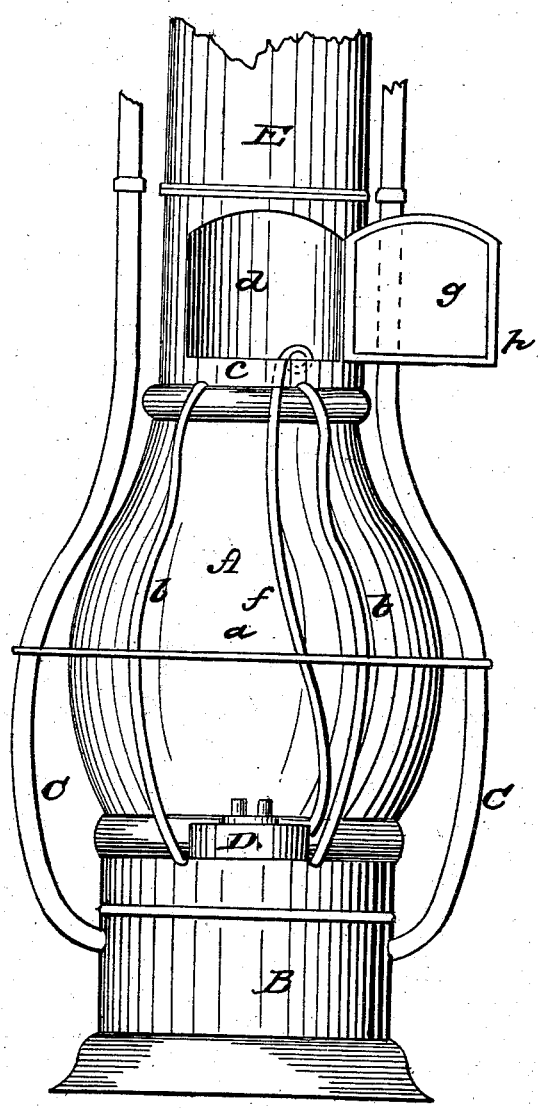
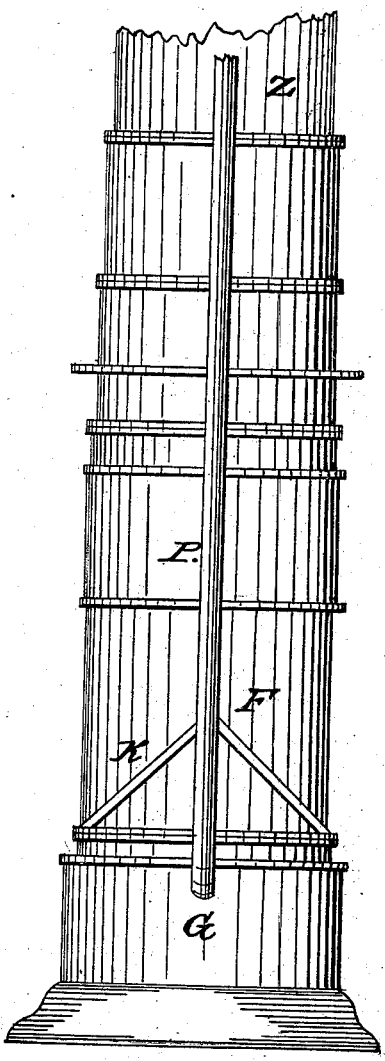
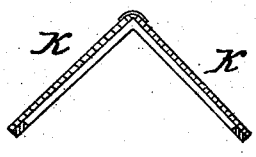
Witnesses
Snowden Bell
Wm. P. Baldwin
Inventor
Sarah P. Mather

UNITED STATES PATENT OFFICE.

SARAH P. MATHER, OF NEW YORK, N. Y.

IMPROVEMENT IN SUBMARINE TELESCOPES.

Specification forming part of Letters Patent No. 43,465, dated July 5, 1864.

*To all whom it may concern:*

Be it known that I, SARAH P. MATHER, of the city, county, and State of New York, have invented a new and useful Improvement in Submarine Telescopes; and I do hereby declare that the following is a full, clear, and exact description thereof, reference being had to the accompanying drawings, making a part of this specification, in which—

Figure 1 is a view in elevation of the submarine telescope. Fig. 2 is a view in elevation of the submarine lamp with one of my improvements attached, and Fig. 3 is a view in section of my improved reflector for the submarine telescope.

Letters Patent of the United States were granted to me on the 16th day of April, 1845, No. 3,995, for an improvement in submarine telescopes. As the lantern was then constructed it was found difficult to effectually prevent the lamp from being extinguished when used at great depths, owing to the greatly-increased pressure of the water, and the telescope was defective because it used but a single mirror, and thus reflected but a limited field on one side of the telescope, and to change its position required much time, and in many conditions it was found extremely troublesome to change the position of both the telescope and lamp to obtain a new view from the same station. Now my present invention relates to improvements thereon, in order to facilitate the introduction or withdrawal of the lamp from the lantern, and to double the field of vision from a single station without changing the position of either the telescope or lamp; and to this end my invention consists, first, in providing the lantern with an opening on the side through which to insert and withdraw the lamp, and closing the same with a water-tight shutter that grows tighter as the pressure of the water increases, so as to protect the lamp against the entrance of water upon it when in use, second, in constructing and using within the submarine telescope a double mirror, arranged in a proper angle to reflect objects on both sides of the telescope at the same instant, so that the field of vision from a single station is doubled without changing the position of either the lamp or telescope; third, in so combining the lamp and telescope that they may be effectually used as a single instrument, and that under circumstances where it would be hardly practicable to use them separately with the requisite promptness.

In order to use my invention it is necessary to employ an isolated light to illuminate the object to be examined under deep water and an isolated reflector in which the objects can be seen from above the water and from a permanent or floating station, and both the light and reflector must be capable of being sunk in deep or held stationary in moving water. Now, it is obvious that to burn a steady light under deep or in rapid water it must be supplied with a sufficient quantity of atmospheric air from above the water and be inclosed in a shield strong enough to resist the pressure of water at the greatest depths in which it is desired to use the light.

In the accompanying drawings I have shown in Fig. 2 a lantern calculated to fill perfectly the above-recited conditions, on which a glass globular body, A, is supported upon a strong metal chamber, B, having air-pipes C attached to its sides and opening therein beneath the seat of the lamp D. The body A is shielded by strengthening and shield wires $a\ b$, as many in number as are necessary to protect the glass from being broken. To the top of the body A a metal frame, $c$, is made fast by the strengthening-wires $b\ b$, which at their lower ends are attached securely to the metal chamber B, and both the chamber B and frame $c$ are united securely to the body A by a firm cement of any suitable character to form a perfectly water-tight joint. The frame $c$ may be of any desired form, though circular may prove the best, as it is to carry the tube to convey the smoke from the lamp and ventilate the lantern. To the top of the frame A is attached in any manner a succession of tubes, the first one, E, shown as broken in the drawings until the whole attains a length equal to the depth of the object to be examined—say from the deck of a floating ship to the wreck of a sunken vessel, in exploring which my invention is to be used. It is obvious that the air-pipe C must also be extended by successive joints until they reach above the water, and all these tubes and pipes may be arranged substantially as shown in my original patent, care being taken to have all the joints that are to be immersed perfectly water-tight.

Now, to introduce the lamp into the lantern when it is to be put in use and to withdraw the lamp when the fluid or wick requires renewal, I have placed an opening, d, in the side of the frame c, centrally between the pipes C, and large enough to permit the passage through it of the lamp D, which has a rod, f, attached, reaching to the opening, so as to be reached by the hand. The opening is closed by the door g, so hinged and fastened as that the flexible packing h around its edges will be equally pressed against the walls of the opening, and thus make the joint around the opening effectually water-tight.

It is obvious that any description of artificial light may be used with my lantern, with only an adaptation of the opening to the proper packing for different lights—as, for example, the use of gas-light would require but an adaptation of the opening to the introduction of the conducting-pipes and the securing a proper packing of the openings around them, while the packing should be rendered only the more effectual as the pressure of the water became greater.

The construction of my telescope is similar to my lantern. It has a glass chamber, F, supported on a metal chamber, G, and a tube, H, on its top to support the extension-tubes, a broken one of which is shown at Z. From the bottom of the chamber G pipes P ascend with the center tube and are jointed, like it, for the distance required for any depth of water. These pipes are to supply a current of air to the chamber G in order to enable it the better to resist the pressure of deep water, and the joints throughout the whole telescope must be positively water-tight, and the whole may be constructed substantially as in my original patent. In the glass chamber F, I place a double mirror, K, so that its sides rest at about an angle of ninety degrees to each other, as shown in Fig. 3. These mirrors meet at their upper edges and there they occupy a central position with the glass chamber, while at their lower edges they rest against the walls of the chamber, so that each, when seen through the tube H, truly reflects all objects in the water that are illuminated by the lantern on both sides of the telescope.

By this invention my instrument is capable of covering the whole field illuminated from one side of the lantern and reflecting the surrounding objects above the surface of the water, so as to be observed at a single observation from any given station, instead of having to shift the relative positions of the mirror or lantern, or both, as in my original patent.

Both my telescope and lantern have hooks or rings in the bottom to attach weights or cords by which they can be sunk to the position required, substantially as in my original patent.

Now, by having a proper device for properly inserting the light into the lantern and a double mirror in the telescope which will truly reflect objects on both sides of them at one observation from the same station, I am enabled, by placing the lantern so that its light shall occupy a position close to but at the outer edges of the mirrors, to unite the two—that is, the lantern and its tubes with the telescope and its tubes—in any secure manner and thus use them as one instrument, which in rapid water or water that is very deep saves much time and inconvenience, and will render my invention highly useful under conditions where it would be extremely difficult to make them operate effectually when used separately.

It is obvious that by the reflection of objects on both sides of the telescope to the same station human life might be saved when drowning must ensue if the observation had been limited to but one side of the instruments, and that such observations can be far more rapidly made when the lantern and telescope are combined in one instrument than they can when both are used separately.

To rescue the drowning, recover the drowned, explore wrecks, examine foundations, lay moles, locate reefs in channels, discern snags or torpedoes and other obstructions in rivers are but a few of the important uses of my invention.

What I claim as my invention, and desire to secure by Letters Patent of the United States, is—

1. The combination of the opening d and the door g with the submarine lantern and lamp, when so arranged and operating that the pressure of the water in which the lantern is immerged shall pack the joint between the door and opening and render it water-tight, substantially as described.

2. The combination of a double reflector with the telescope, when arranged and operating substantially in the manner and for the purposes described.

3. The combination of the lamp with the reflector, when the lantern and telescope are so united as to be used as a single instrument, and when all the objects illuminated by one side of the lamp are truly reflected by the mirrors at one observation and to a single station, as set forth.

In testimony whereof I have hereunto subscribed my name.

SARAH P. MATHER.

Witnesses:
SNOWDEN BELL,
FR. SCHNEIDER.